US 11,966,310 B1

(12) United States Patent
Singer et al.

(10) Patent No.: US 11,966,310 B1
(45) Date of Patent: Apr. 23, 2024

(54) ANALYSIS OF EVENTS IN AN INTEGRATED CIRCUIT USING CAUSE TREE AND BUFFER

(71) Applicant: MELLANOX TECHNOLOGIES, LTD., Yokneam (IL)

(72) Inventors: Alon Singer, Tel Aviv (IL); Ziv Battat, Tel Aviv (IL); Liron Mula, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 9 days.

(21) Appl. No.: 17/981,508

(22) Filed: Nov. 7, 2022

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/3037* (2013.01); *G06F 11/079* (2013.01); *G06F 11/3075* (2013.01); *G06F 11/3409* (2013.01)

(58) Field of Classification Search
CPC ............... G06F 11/079; G06F 11/3075; G06F 11/3037; G06F 11/3409
See application file for complete search history.

(56) References Cited

U.S. PATENT DOCUMENTS

| | | | |
|---|---|---|---|
| 5,568,644 A | 10/1996 | Nelson et al. | |
| 9,563,494 B2* | 2/2017 | Moyer | G06F 11/0757 |
| 10,733,165 B1* | 8/2020 | Broad | G06F 9/5038 |
| 2005/0005089 A1 | 1/2005 | Eckhart et al. | |
| 2015/0134601 A1* | 5/2015 | Anderson | G06F 16/24578 707/748 |
| 2020/0151268 A1* | 5/2020 | Johnson | G06F 16/2246 |
| 2022/0035694 A1* | 2/2022 | Yu | G06F 11/327 |

OTHER PUBLICATIONS

Sarwar, "CMOS Power Consumption and Cpd Calculation," Application Report SCAA035B, Texas Instruments Incorporated, pp. 1-16, Jun. 1997.

* cited by examiner

*Primary Examiner* — Elmira Mehrmanesh
(74) *Attorney, Agent, or Firm* — KLIGLER & ASSOCIATES PATENT ATTORNEYS LTD.

(57) ABSTRACT

An Integrated Circuit (IC) includes one or more functional hardware circuits, one or more processor cores, a cause-tree circuit, a memory buffer, and an analysis circuit. The processor cores are to handle events occurring in the functional hardware circuits. The cause-tree circuit includes leaf nodes, middle nodes and a root node. The leaf nodes are to collect the events from the one or more functional hardware circuits. The middle nodes are to coalesce the collected events and to deliver the events to the root node. The memory buffer is to buffer a plurality of the events delivered to the root node, so as to trigger the processor cores to handle the buffered events. The buffer analysis circuit is to analyze a performance of the cause-tree circuit based on the events buffered in the memory buffer.

16 Claims, 4 Drawing Sheets

ANALYSIS OF EVENTS IN AN INTEGRATED CIRCUIT USING CAUSE TREE AND BUFFER

FIELD OF THE INVENTION

The present invention relates generally to integrated circuits, and particularly to methods and systems for the analysis of event handling in integrated circuits.

BACKGROUND OF THE INVENTION

Electronic systems and devices sometimes handle events such as interrupt requests using a hierarchical priority tree.

U.S. Pat. No. 5,568,644 discloses a computer system comprising devices, each device is represented by a node in a hierarchical tree, referred to herein as an interrupt source tree (IST). The root and intermediate nodes of the IST represent dispatching or determining points; this removes the need for the device drivers to contain dispatching code; the drivers now only need to contain interrupt handling code specific to the device itself. At these nodes code is executed to determine which branch to take down the IST. The bottom nodes are the leaf nodes; the leaf nodes identify the device interrupt handler. By moving the determination steps performed by the different device drivers to the nodes of the IST, the device drivers are modular and portable. Furthermore, changes to the computer system configuration, which in the prior art would require modification of all device drivers, can be adapted to by modification of the IST.

U.S. Patent Application Publication 2005/0005089 discloses a condition management system and method of operation thereof for use with a processor employing a hierarchical register consolidation structure (HRCS). In one embodiment, the system includes a condition management structure (CMS) that abstracts groups of status indicators associated with the HRCS into a tree of hierarchical container objects and element objects. Each of the container objects is associated with at least one of the element objects and linked to a single parent object, and each of the element objects is configured to represent at least one of the status indicators and linked to a single child object. The system further includes an abstraction retrieval subsystem that employs the CMS to traverse the HRCS to determine a condition of at least one of the status indicators, and an abstraction management subsystem that employs the CMS to control a propagation of selected ones of the status indicators through the HRCS.

SUMMARY OF THE INVENTION

An embodiment of the present invention that is described herein provides an Integrated Circuit (IC) including one or more functional hardware circuits, one or more processor cores, a cause-tree circuit, a memory buffer, and an analysis circuit. The processor cores are to handle events occurring in the functional hardware circuits. The cause-tree circuit includes leaf nodes, middle nodes and a root node. The leaf nodes are to collect the events from the one or more functional hardware circuits. The middle nodes are to coalesce the collected events and to deliver the events to the root node. The memory buffer is to buffer a plurality of the events delivered to the root node, so as to trigger the processor cores to handle the buffered events. The buffer analysis circuit is to analyze a performance of the cause-tree circuit based on the events buffered in the memory buffer.

In some embodiments, the one or more functional hardware circuits are to process communication packets. In an embodiment, the buffer analysis circuit is to produce a histogram of fill levels of the memory buffer. In another embodiment, the buffer analysis circuit is to produce a histogram of waiting times of the events in the memory buffer. In yet other embodiments, the buffer analysis circuit is to track a performance metric of the memory buffer, and to provide the performance metric for analysis by an external device.

There is additionally provided, in accordance with an embodiment of the present invention, a method in an Integrated Circuit (IC) that includes one or more functional hardware circuits. The method includes handling events occurring in the one or more functional hardware circuits using one or more processor cores. The events are collected from the one or more functional hardware circuits using leaf nodes of the cause-tree circuit, the collected events are coalesced using middle nodes of the cause-tree circuit, and the coalesced events are delivered to a root node of the cause-tree circuit. A plurality of the events delivered to the root node is buffered in a memory buffer, so as to trigger the processor cores to handle the buffered events. A performance of the cause-tree circuit is analyzed based on the events buffered in the memory buffer.

There is also provided, in accordance with an embodiment of the present invention, an electronic circuit including one or more functional hardware circuits, one or more processing circuits, a cause-tree circuit, a memory buffer and a buffer analysis circuit. The processing circuits are to handle events occurring in the one or more functional hardware circuits. The cause-tree circuit is to collect the events from the one or more functional hardware circuits and to coalesce the collected events. The memory buffer is to buffer a plurality of the coalesced events, so as to trigger the processing circuits to handle the buffered events. The buffer analysis circuit is to analyze a performance of the cause-tree circuit based on the events buffered in the memory buffer.

The present invention will be more fully understood from the following detailed description of the embodiments thereof, taken together with the drawings in which:

DETAILED DESCRIPTION OF EMBODIMENTS

Overview

Figure 1:
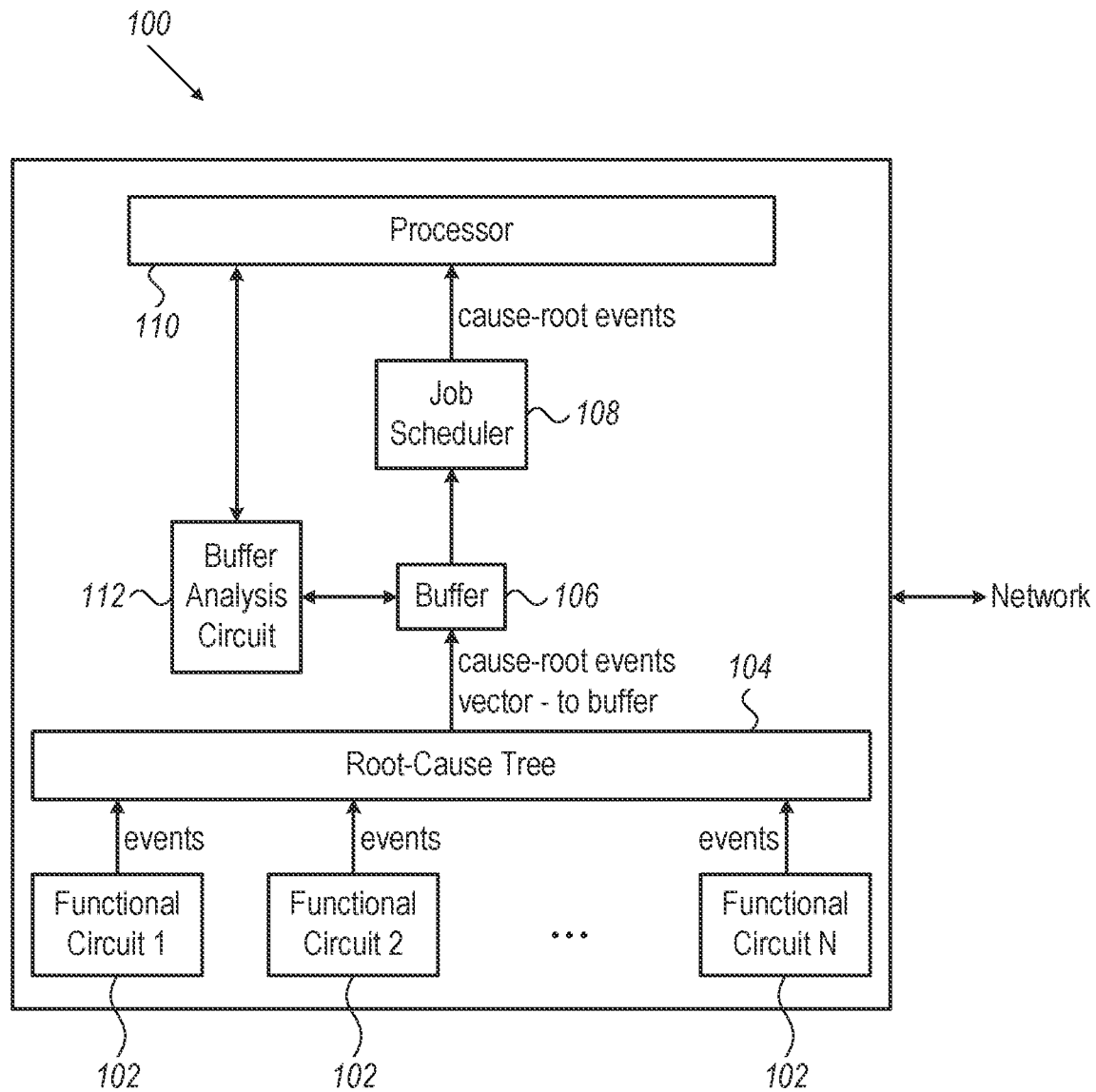
FIG. 1 is a block diagram that schematically illustrates a network device that facilitates gathering of events statistics, in accordance with an embodiment of the present invention.

Processors in electronic systems in general and in network devices in particular, typically receive multiple events such as interrupt requests from a plurality of sources. The processor sometimes handles one interrupt at a time, and, therefore, a cause-tree circuit is often used, which hierarchically coalesces events from multiple sources, to generate a single interrupt to the processor. In this structure, events wait until higher priority events are processed. The time that an event may wait depends upon other events, the priority structure of the cause-tree structure and the amount of processing power allocated for event handling.

Event handling performance analysis may be needed, for example, to dynamically change the processing power allocation scheme, or, for another example, to provide data towards the design of a "next generation" system. Embodiments according to the present invention that are disclosed herein provide circuits and methods to facilitate efficient event analysis in network devices. In embodiments, buffer and statistics circuitry are added to the cause tree, to facilitate event handling statistics gathering.

In an embodiment, the event cause tree coalesces and propagates events to a buffer (e.g., a first-in first-out (FIFO) memory), and a buffer analysis circuit gathers statistics from the buffer. A processor of the network device, which may comprise one or more processor cores, reads and handles event statistics from the buffer analysis circuit. In some embodiments, the buffer analysis circuit is configured to generate buffer usage histograms, such as time of events in the buffer and number of events in the buffer. In some embodiments, the buffer analysis circuit is controlled and monitored by the processor of the network device.

Thus, according to embodiments of the present invention, users can analyze event handling performance in network devices, including statistics pertaining to service latency time and to number of pending events.

System Description

Processors in network devices typically receive multiple events such as interrupt requests from a plurality of sources (the sources will be referred to herein as functional circuits or functional hardware circuits). The processor typically handles one interrupt at a time, and, therefore, a cause-tree circuit is often used, which hierarchically coalesces events from multiple sources, to generate a single interrupt to the processor. In this structure, events wait for the completion of higher priority events processing. The time that an event may wait depends upon other events, upon the priority structure of the cause-tree, upon the amount of processing power allocated for event handling and, possibly, upon other factors.

In embodiments, the network device comprises one or more integrated circuits, that comprise one or more processor and other network processing circuitry. We will, therefore, refer below interchangeably to network devices and integrated circuits.

Embodiments according to the present invention add to the cause tree a buffer and statistics circuitry, to facilitate event handling statistics gathering.

FIG. 1 is a block diagram that schematically illustrates a network device 100 that facilitates gathering of events statistics, in accordance with an embodiment of the present invention. Network device 100 may comprise, for example, a network adapter (e.g., Network Interface Controller—NIC) or a network switch.

The network device comprises functional circuits 102 that may trigger events. For example, in embodiments, some (or all) of the functional circuits may comprise communication ports, which generate events if an ingress or an egress queue is congested.

The events are input to a Root Cause Tree 104 (also referred to as a cause-tree circuit), which is configured to hierarchically coalesce and propagate events according to causes, and to output a vector of cause-root events to a buffer 106. In some embodiments, buffer 106 comprises a First-In-First-Out (FIFO) memory. The vector of cause events that the buffer outputs is input to a job scheduler 108, which is configured to schedule one or more of the events for handling by processor 110. The processor is configured to handle the events using suitable software. In some embodiments processor 110 comprises one or more processor cores (typically a plurality of processor cores, e.g., RISC cores) one or more of which may be configured to handle the events.

As will be described below, in some embodiments, buffer 106 stores, in addition to cause-root event vectors, a timestamp that indicates the time at which the events vector is input to the buffer.

Event statistics is collected by a buffer-analysis circuit 112, which communicates the statistics results (and setup) with the processor. In some embodiments, the buffer analysis circuit is configured to collect histograms pertaining, for example, to the number of pending events (e.g., the number of entries in the buffer, at any time). In other embodiments, the buffer analysis circuit may collect time-to-service statistics, by comparing the timestamps of events that are output from the buffer to a current time.

Thus, according to the example embodiment illustrated in FIG. 1, a first-in-first-out buffer that is added between the root-cause tree and the processor and a buffer analysis circuit facilitate the gathering of events handling statistics.

The configuration of network device 100, illustrated in FIG. 1 and described hereinabove, is cited by way of example. Other configurations may be used in alternative embodiments. For example, in some embodiments, the root-cause tree may be replicated for parallel handling of a plurality of event priorities. In an embodiment, the root-cause tree may be replaced by a flat-hierarchy fixed-priority circuit. In some embodiments, more than one processor core in processor 110 may be assigned to handle the events and, thus, more than one event may be handled concurrently.

Figure 2:
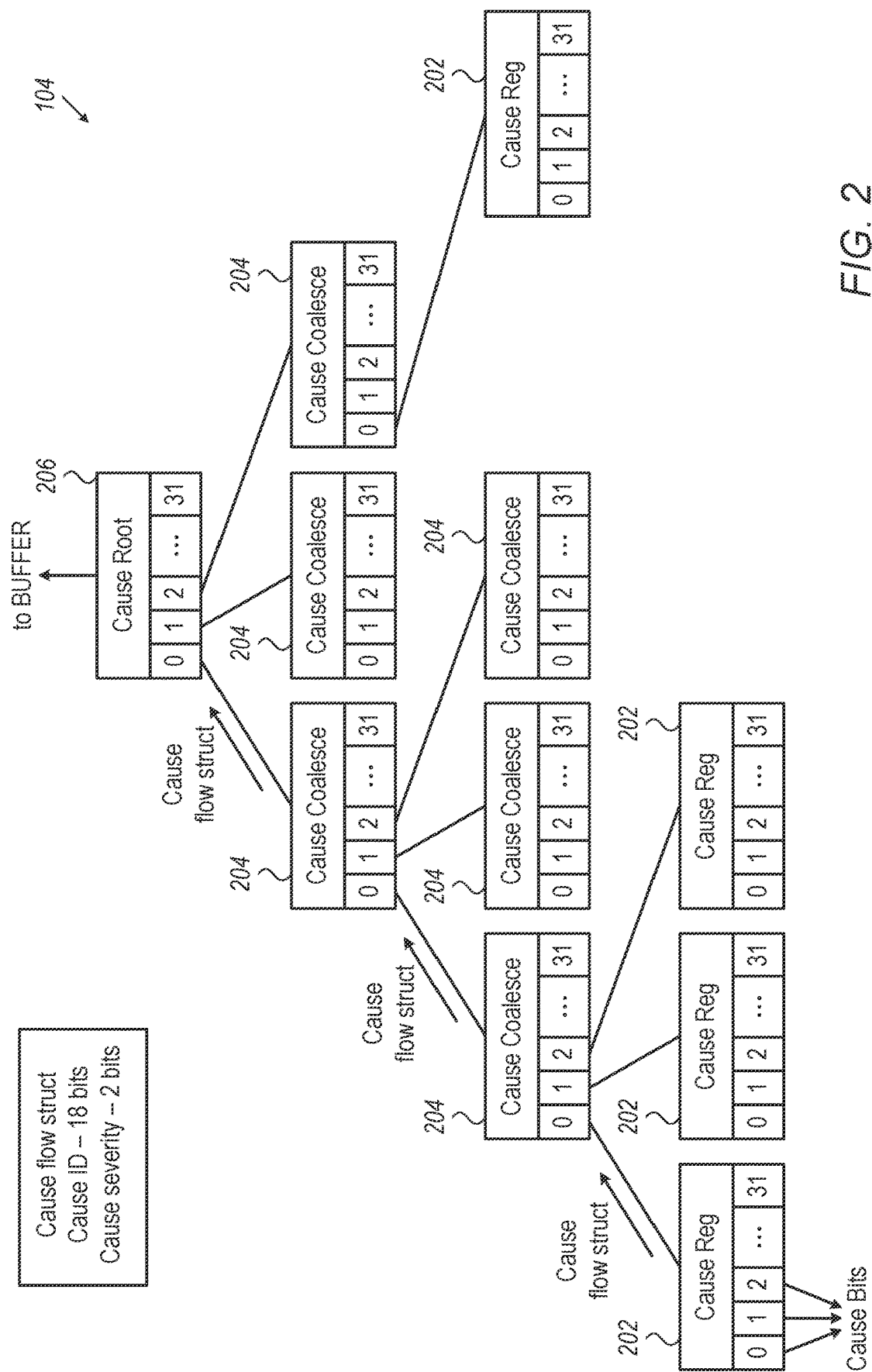
FIG. 2 is a block diagram that schematically illustrates a root-cause tree, in accordance with an embodiment of the present invention.

FIG. 2 is a block diagram that schematically illustrates a root-cause tree 104, in accordance with an embodiment of the present invention. Root cause tree 104 propagates cause events from functional circuits 102 (seen in FIG. 1) that are coupled to the tree's "leaves", through the tree's "branches" and to the "root", which is coupled to processor 110. (Contrary to the laws of conventional botany, the "tree" in FIG. 2 is illustrated upside-down, with the "leaves" at the bottom and the "root" at the top. Accordingly, we will use the terms Above and Below to indicate towards-the-root or toward the-leaves directions, respectively.)

The "leaves" (also referred to as "leaf nodes") of the tree comprise cause registers 202. Each of functional circuits 102 forwards event indicators (also referred to as Causes) to a respective cause register. According to the example configuration illustrated in FIG. 2, each cause register comprises 32 bits, to handle up to 32 cause events from each functional circuit 102. In embodiments, the number of bits may be different than 32; in an embodiment, the number of bits may vary between the cause registers.

The "branches" of the tree (also referred to as "middle nodes") comprise cause-coalesce circuits 204, which are arranged in hierarchical layers. Each cause-coalesce circuit is configured to receive a cause ID from a cause-coalesce circuit in a branch below (or from a cause register), coalesce the input cause-IDs and output a cause-ID to a cause-coalesce circuit in the layer above. If the cause-coalesce circuit if in the top layer, the cause-coalesce circuit outputs the ID to a root-cause circuit 206 (also referred to as a "root node").

According to the example embodiment illustrated in FIG. 2, cause registers 202 are coupled to a first layer of cause-coalesce circuits 204, which, in turn, are coupled to a second layer of cause-coalesce circuits. More layers (that are not shown in FIG. 2) of cause-coalesce circuits may be used; the top-layer cause coalesce circuit is coupled to a cause-root circuit 206.

The cause registers are configured to indicate to the cause coalesce circuit to which they are coupled that at least one of the cause register bits is set, indicating a pending cause event. When the coupled cause coalesce circuit is ready, the cause register will select a cause event bit and send corresponding id codes and severity indications to the cause coalesce circuit. According to the example embodiment illustrated in FIG. 2, the ID code comprises 18 bits and the severity indicator comprises two bits. Other number of bits may be used in alternative embodiments. In some embodiments the cause registers comprise a rotating priority scheme to select a pending cause events.

Like the cause registers, the cause coalesce circuits select a pending cause event according to a priority scheme and send the corresponding ID and severity indication up. The cause-coalesce circuits at the top level send the cause ID and severity indication to the cause-root circuit 206, which sends cause events to buffer 106 (FIG. 1).

Thus, according to the example embodiment illustrated in FIG. 2, cause events from functional circuitry propagate throughout a cause tree, from cause registers, at the bottom, through cause-coalesce circuits and up to a cause-root circuit (and thence, through buffer 106 and scheduler 108, to processor 110).

The configuration of cause tree 104, illustrated in FIG. 2 and described hereinabove, is cited by way of example. Other configurations may be used in alternative embodiments. For example, in some embodiments the tree is flat, and all cause registers are coupled directly to the cause-root circuit. In an embodiment, tree 104 is duplicated to handle a plurality of priority levels, and in another embodiment each cause register and cause coalesce circuit is configured to handle causes in a plurality of priorities, always selecting the higher priority cause (in yet another embodiment, the priority of a pending cause may increase in time, to avoid the case that an event will never be served).

Figure 3:
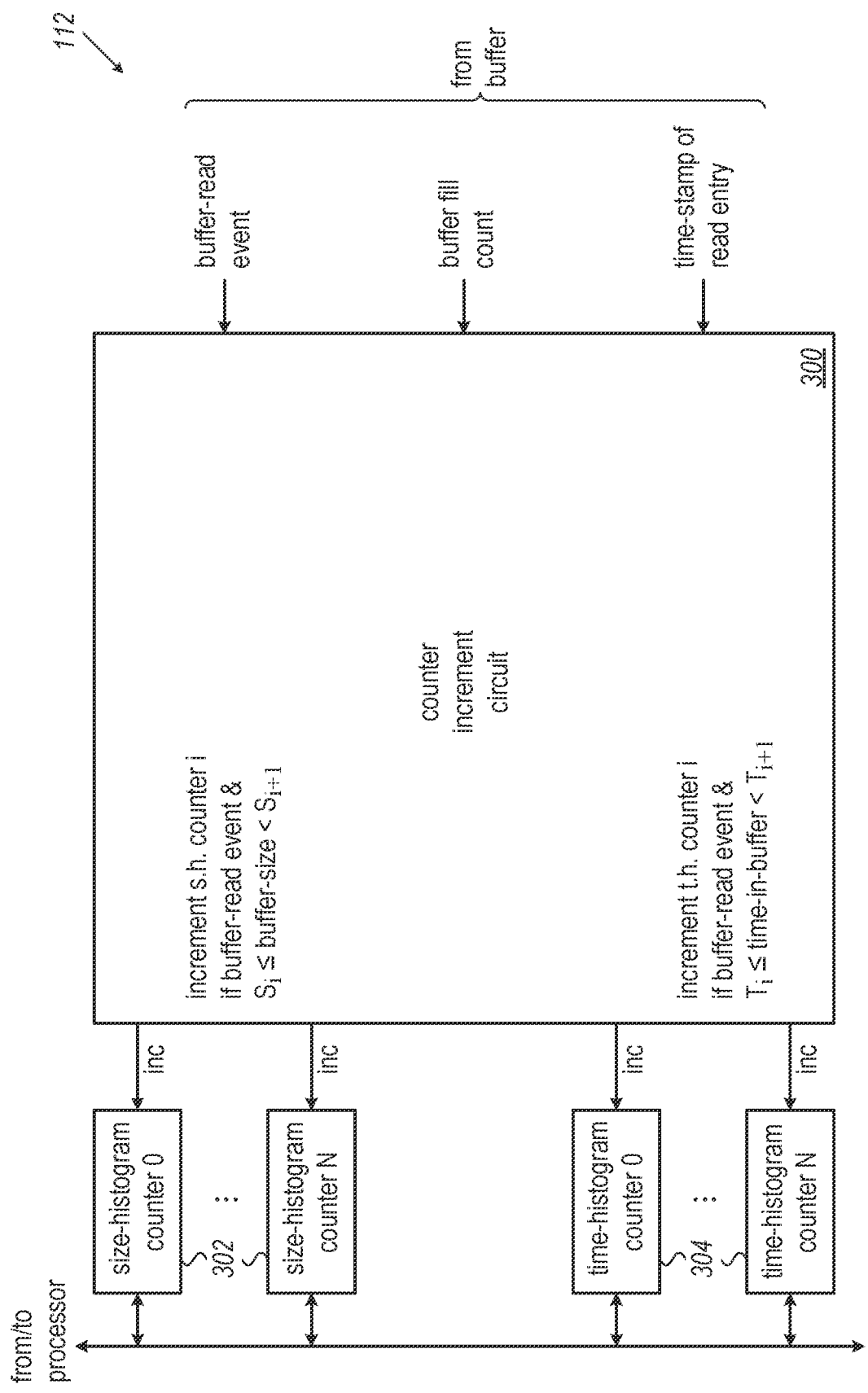
FIG. 3 is a block diagram that schematically illustrates a buffer analysis circuit, in accordance with an embodiment of the present invention.

FIG. 3 is a block diagram that schematically illustrates a buffer analysis circuit 112, in accordance with an embodiment of the present invention. According to the example embodiment illustrated in FIG. 3, the buffer analysis circuit is configured to generate a buffer depth histogram (e.g., the number of causes that are pending at any time) and a time to service histogram (e.g., time from a cause event generated by the functional circuit to the time that the cause event is handled by the processor). Buffer analysis circuit 112, however, is by no way limited to buffer-depth and time-in-buffer histograms. In various embodiments, the buffer analysis circuit may be configured to analyze performance aspects such as maximum time to service per priority level, average and standard deviation of the time-to service per priority, and many others.

Buffer analysis circuit 112 comprises a counter-increment circuit 300, size-histogram counters ($SH_i$) 302 and time-histogram counters ($TH_i$) 304. All counters are coupled to a processor (e.g., processor 110, FIG. 1), which may clear the counters to start a histogram and read the counters to get the collected results (in some embodiments, to read a coherent histogram, the processor may, while reading the counters, freeze all counting).

To collect a buffer-size histogram, each of $SH_i$ counters 302 is assigned a range of possible size values; for example, counter $SH_0$ may be used to count size values from zero to 9, $SH_1$ may be used to count size values from 10 to 19, etc. The counter-increment circuit will, responsively to buffer-read events (e.g., the transferring a cause evet to the processor), increment a counter $SH_i$ of counters 302 for which $$S_i \leq \text{size of buffer} < S_{i+1}.$$

To collect time-in-buffer statistics, buffer 106 comprises timestamp fields; each cause event that enters the buffer is assigned a timestamp; when a cause event is read from the buffer to the processor, the buffer analysis circuit subtracts the corresponding timestamp from the current time, to get the time duration of the cause event in the buffer.

Each of $TH_i$ counters 304 is assigned a range of possible time values; for example, counter $TH_0$ may be used to count time values from zero to 5 μS, $TH_1$ may be used to count time values between 5 μS and 10 μS, etc. The counter-increment circuit will, responsively to buffer-read events, increment a counter $TH_i$ of counters 304 for which $$T_i \leq \text{time-in-buffer} < T_{i+1}.$$

The configuration of buffer analysis circuit 112 illustrated in FIG. 3 and described hereinabove is cited by way of example. Other configurations may be used in alternative embodiments. For example, in some embodiments, some or all the histograms described above are collected by a processor (rather than by counters such as counter 302, 304)— either a dedicated processor or processor 110. In an embodiment, counter-increment circuit 300 is configured to collect a single type of histogram at a time, as directed by processor 110 and using a single set of counters.

Figure 4:
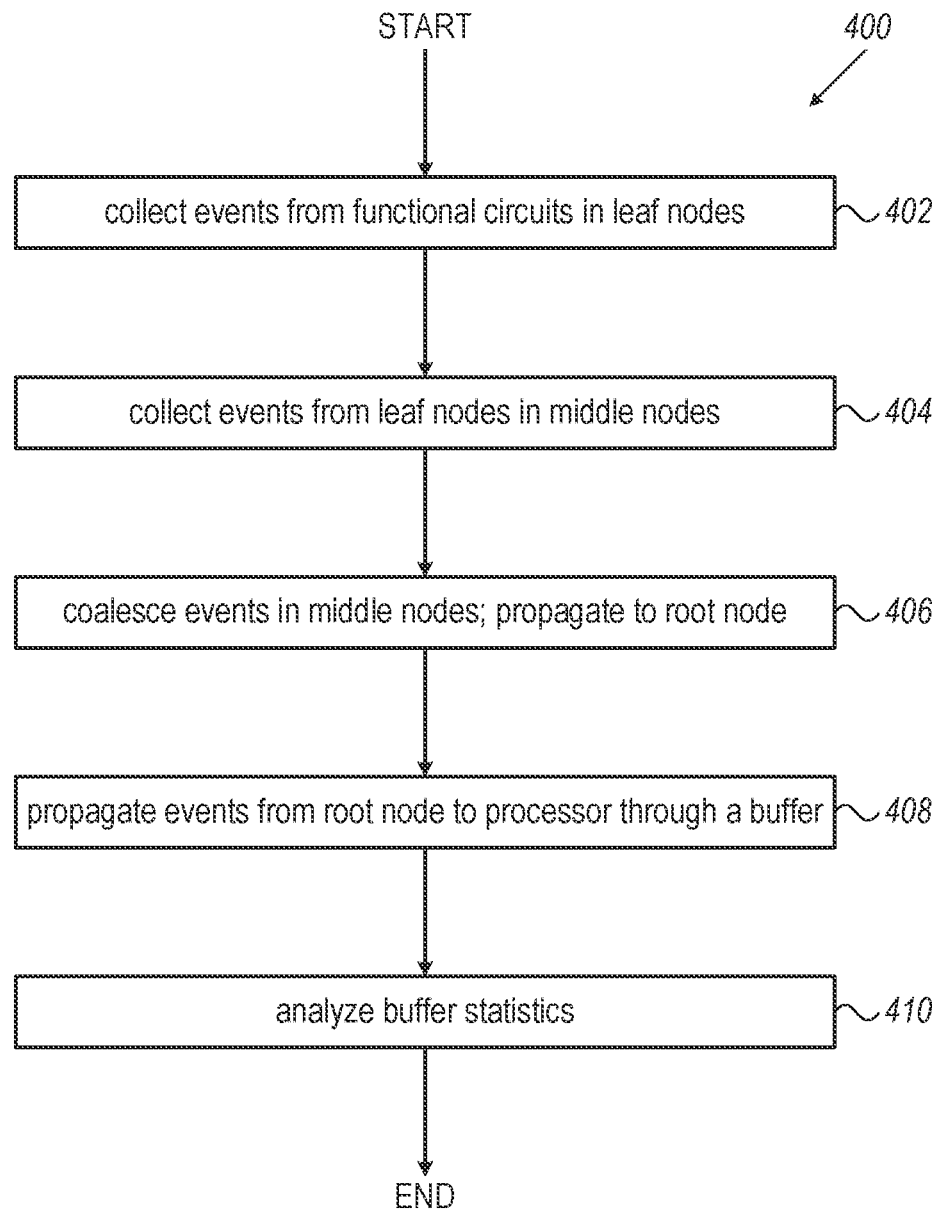
FIG. 4 is a flowchart that schematically illustrates a method for cause event analysis in a network device, in accordance with an embodiment of the present invention.

FIG. 4 is a flowchart 400 that schematically illustrates a method for cause event analysis in a network device, in accordance with an embodiment of the present invention. The method is executed by root-cause tree 104 (and the various subunits thereof), buffer 106 and buffer analysis circuit 112 (FIG. 1).

The flowchart starts at a collect-functional-circuits-events operation 402, wherein leaf nodes (e.g., cause regs 202, FIG. 2) collect cause events that the functional circuits generate. Next, at a collect-events-in-middle-nodes operation 404, the leaf nodes send the cause events up, to middle nodes of the tree (e.g., to cause-coalesce circuits 204, FIG. 2). In embodiments, the leaf nodes comprise a priority resolution means that select a cause event from a plurality of cause events, according, for example, to a rotating priority scheme.

The middle nodes of the tree then, at a coalesce events operation 406, coalesce cause events and propagate the events to higher hierarchy middle nodes, and up to a root node (e.g., cause root circuit 296, FIG. 2).

Next, in a propagate in buffer operation 408, cause events from the root node propagate in a first-in-first-out (FIFO) buffer to processor 110 (FIG. 1). The buffer is read when the processor is ready to process the next cause event.

Lastly, in an analyze-buffer-statistics operation 410, Buffer-Analysis circuit 112 analyzes various buffer usage statistics. In an embodiment, the statistics may comprise buffer size and time-in-buffer histograms, or other statistics histograms and parameters.

The configuration of flowchart 400. Illustrated in FIG. 4 and described hereinabove is cited by way of example. Other flowcharts may be used in alternative embodiments. For example, in some embodiments, root-cause tree 104 is flat, and operation 406 changes accordingly.

The configurations of network device 100, root-tree 104, buffer 106, buffer-analysis circuit 112 and the method of flowchart 400, illustrated in FIGS. 1 through 4 and described hereinabove, are example configurations, and flowcharts that are shown purely for the sake of conceptual clarity. Any other suitable configurations and flowcharts can be used in alternative embodiments. The different sub units of network device 100 may be implemented using suitable hardware, such as in one or more Application-Specific Integrated Circuits (ASICs) or Field-Programmable Gate Arrays (FPGAs), using software, using hardware, or using a combination of hardware and software elements.

Processor 110 (FIG. 1) may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address analysis of events in a network device, the methods and systems described herein can also be used in other computing systems and in applications. For example, the disclosed buffer analysis circuit can be used to analyze port queues. Although the embodiments described herein refer mainly to ICs, the disclosed techniques can be used in other kinds of electronic circuits. Additionally or alternatively to processing cores, events may be handled by other suitable types of processing circuits.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
one or more functional hardware circuits;
one or more processor cores, to handle events occurring in the one or more functional hardware circuits;
a cause-tree circuit to deliver the events from the one or more functional hardware circuits to the one or more processor cores for handling, the cause-tree circuit comprising leaf nodes, middle nodes and a root node, the leaf nodes comprising storage elements to collect the events from the one or more functional hardware circuits, and the middle nodes comprising coalescing circuits to coalesce the collected events and to deliver the events to the root node;
a memory buffer coupled to the root node of the cause-tree circuit, the memory buffer to buffer a plurality of the events delivered to the root node, so as to trigger the processor cores to handle the buffered events; and
a buffer analysis circuit, to analyze a performance of the cause-tree circuit based on the events buffered in the memory buffer.

2. The IC according to claim 1, wherein the one or more functional hardware circuits are to process communication packets.

3. The IC according to claim 1, wherein the buffer analysis circuit is to produce a histogram of fill levels of the memory buffer.

4. The IC according to claim 1, wherein the buffer analysis circuit is to produce a histogram of waiting times of the events in the memory buffer.

5. The IC according to claim 1, wherein the buffer analysis circuit is to track a performance metric of the memory buffer, and to provide the performance metric for analysis by an external device.

6. A method in an Integrated Circuit (IC) that includes one or more functional hardware circuits, the method comprising:
handling events occurring in the one or more functional hardware circuits using one or more processor cores;
delivering the events, from the one or more functional hardware circuits to the one or more processor cores, by a cause tree circuit comprising leaf nodes, middle nodes and a root node, wherein delivering the events comprises collecting the events from the one or more functional hardware circuits using storage elements in the leaf nodes of the cause-tree circuit, coalescing the collected events using coalescing circuits in the middle nodes of the cause-tree circuit, and delivering the coalesced events to the root node of the cause-tree circuit;
buffering a plurality of the events delivered to the root node in a memory buffer coupled to the root node of the cause-tree circuit, so as to trigger the processor cores to handle the buffered events; and
analyzing a performance of the cause-tree circuit based on the events buffered in the memory buffer.

7. The method according to claim 6, wherein the one or more functional hardware circuits process communication packets.

8. The method according to claim 6, wherein analyzing the performance of the cause-tree circuit comprises producing a histogram of fill levels of the memory buffer.

9. The method according to claim 6, wherein analyzing the performance of the cause-tree circuit comprises producing a histogram of waiting times of the events in the memory buffer.

10. The method according to claim 6, wherein analyzing the performance of the cause-tree circuit comprises tracking a performance metric of the memory buffer, and providing the performance metric for analysis by an external device.

11. An electronic circuit, comprising:
one or more functional hardware circuits;
one or more processing circuits, to handle events occurring in the one or more functional hardware circuits;
a cause-tree circuit, to deliver the events from the one or more functional hardware circuits to the one or more processor cores for handling, the cause tree circuit comprising (i) storage elements to collect the events from the one or more functional hardware circuits, and (ii) coalescing circuits to coalesce the collected events;
a memory buffer coupled to the root node of the cause-tree circuit, the memory buffer to buffer a plurality of the coalesced events, so as to trigger the processing circuits to handle the buffered events; and
a buffer analysis circuit, to analyze a performance of the cause-tree circuit based on the events buffered in the memory buffer.

12. The electronic circuit according to claim 11, wherein the cause-tree circuit comprises leaf nodes, middle nodes and a root node, the leaf nodes comprising the storage elements to collect the events from the one or more functional hardware circuits, the middle nodes comprising the coalescing circuits to coalesce the collected events and to deliver the events to the root node, and the root node to buffer the events in the memory buffer.

13. The electronic circuit according to claim 11, wherein the one or more functional hardware circuits are to process communication packets.

14. The electronic circuit according to claim 11, wherein the buffer analysis circuit is to produce a histogram of fill levels of the memory buffer.

15. The electronic circuit according to claim 11, wherein the buffer analysis circuit is to produce a histogram of waiting times of the events in the memory buffer.

16. The electronic circuit according to claim 11, wherein the buffer analysis circuit is to track a performance metric of the memory buffer, and to provide the performance metric for analysis by an external device.

\* \* \* \* \*